Figure 1:
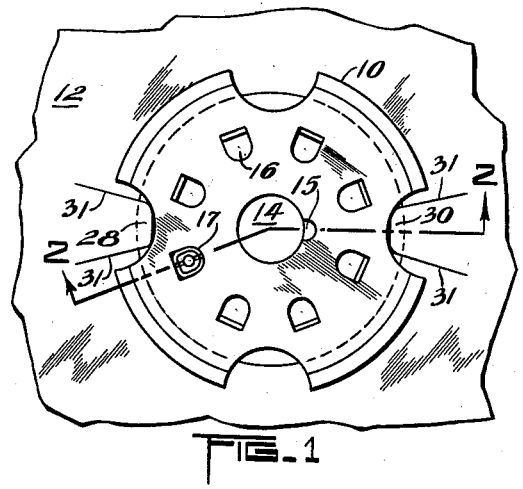

June 8, 1954   J. V. O'NEILL   2,680,840
MEANS FOR SECURING SOCKETS IN PERFORATED PANELS
Filed Nov. 6, 1948

INVENTOR.
James V. O'Neill
BY
A. L. B. Richardson
Attorney

Patented June 8, 1954

2,680,840

UNITED STATES PATENT OFFICE 2,680,840

MEANS FOR SECURING SOCKETS IN PERFORATED PANELS

James Vincent O'Neill, Emporium, Pa., assignor to Sylvania Electric Products Inc., a corporation of Massachusetts Application November 6, 1948, Serial No. 58,731

1 Claim. (Cl. 339—126)

The present invention relates to an improved form of electrical connector socket device, and is particularly directed to a novel form of radio tube socket construction.

An object of the present invention is the provision of a novel form of socket construction adapted to receive plug-in electrical devices.

Another object of the present invention is to provide a socket as aforesaid which may readily be attached to a sheet metal chassis or to a sheet metal mounting plate.

Still another object of the present invention is the provision of a new form of a socket for a plug-in radio tube.

Still a further object of the present invention is the provision of a novel means for securing a radio tube socket into a sheet metal chassis forming part of a radio set.

The foregoing objects, and others which may appear from the following detailed description, may be attained, according to one aspect of the present invention, by providing a socket having a body portion in the form of a generally cylindrical molding of insulating material with a narrow encircling flange at one end. Preferably the body is provided with an axial aperture adapted to receive the locating and lock-in prong of a radio tube, and a number of ancillary apertures regularly spaced about the central aperture, and having their axes generally parallel to the central axis of the molding. These ancillary apertures are adapted to receive socket contact springs adapted to make electrical connection with the connector prongs of the radio tube which is to be plugged into the socket. While the present description is particularly related to a socket for a lock-in tube having eight connector prongs and a central lock-in prong, it should be apparent that the invention may equally well be employed with tubes having other prong arrangements by using a corresponding contact layout. Also the invention may be employed upon sockets for miniature glass tubes and smaller sizes, if desired. The socket body is adapted to be inserted in a hole in a sheet metal chassis of a radio set or into a hole in a separate mounting plate. The extending shoulder or flange prevents the socket from slipping entirely through the hole in the chassis or the mounting plate. A number of semi-circular depressions or grooves are provided on the sides of the socket body and extend through the flange and along the cylindrical wall of the socket body a distance approximately equal to the thickness of the chassis or mounting plate material. The chassis or mounting plate is provided with a number of extending fingers lanced out of the mounting plate material, and extending within the circle of the hole cut in the plate. The number and spacing of the fingers is such that they will cooperate with at least some of the grooves in the socket body. These fingers are bent upwardly to clear the socket so that it may be placed into position. After the socket body is properly located and oriented, the fingers are bent down so that they rest firmly against the ends of the semi-circular grooves in the socket body. Preferably, the fingers are long enough that their ends wedge against the bottoms of the grooves. The downward pressure of the fingers resists upward motion of the socket body, which may occur when a tube is removed from the socket. The pressure of the edges of the fingers against the sides of the grooves resists rotation of the socket body within the hole in the mounting plate. If desired, the mounting plate may have a countersink swaged about the hole and the flange of the socket body may be tapered on its under surface to provide a socket which is substantially flush with the mounting plate. This form of construction permits the punching of a circular hole in the mounting plate and the subsequent lancing of the mounting fingers, at the time the countersink is formed.

Figure 4:
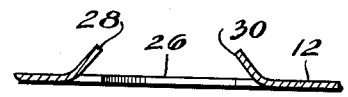
Figure 2:
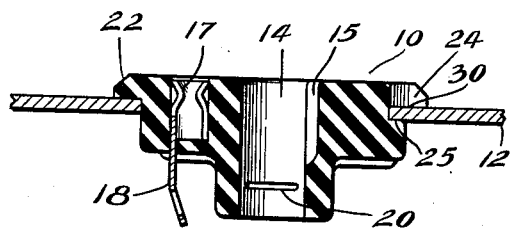
Figure 5:
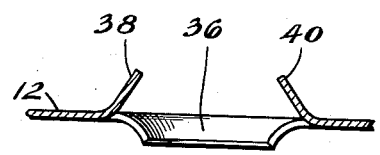
Figure 3:
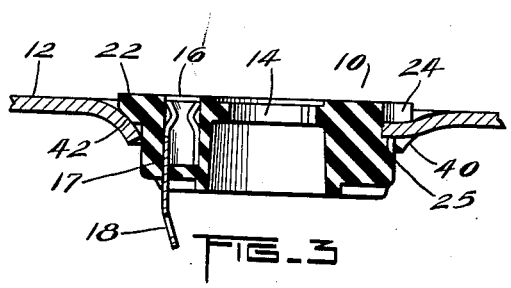

The present invention will be more fully understood by reference to the following detailed description, which is accompanied by a drawing in which, Fig. 1 illustrates in plan view an embodiment of the present invention, while Fig. 2 illustrates, in vertical section, a view taken along line 2—2 of Fig. 1, Fig. 3 illustrates, in vertical section, a modified form of the present invention, while Fig. 4 illustrates, in sectional view, a portion of a socket mounting plate or chassis with the hole punched therein to receive the socket before the socket is inserted or fastened in place, and Fig. 5 is a view similar to Fig. 4 of the form of chassis punching used for securing in place the modified form of socket shown in Fig. 3.

In Figs. 1 and 2, there is shown an embodiment of the present invention, wherein a molded socket having a body member 10 is secured into a mounting plate 12. Mounting plate 12 may be the chassis material of a radio set, or it may be a separate small plate adapted to be separately secured into a chassis. The body 10 is preferably molded from insulating material such as Bakelite or other plastic material. It contains a central aperture 14 having a groove 15 along one side. Aperture 14 and groove 15 are adapted to cooperate with the locating pin of a plug-in radio tube, whereby correct orientation of the tube is obtained when it is inserted into the socket. The socket is also provided with a number of apertures 16 spaced about a circle concentric with the center of aperture 14. Apertures 16 are adapted to receive and retain socket clips 17 which make electrical contact with the connecting prongs on the tube when it is plugged into the socket.

While the present invention is not limited to any particular manner of securing the contact clips 17 into apertures 16, one way in which this may be done is shown in more detail in Fig. 2. Here, it will be seen that the apertures 16 are substantially blind, that is, they do not extend in their full size through the body, but instead have a narrow slit extending through to the rear of the socket molding. Lug 18, forming a part of socket clip 17, passes through the narrow slit, and is bent, or twisted, so as to prevent the socket clip from leaving the apertures 16 as the tube is pulled out of the socket. If desired, in order to maintain the tube more securely in the socket, a detent spring may be clipped into saw slot 20 to engage in a corresponding notch in the locating end of the tube for maintaining the tube in place. The socket body 10 is generally cylindrical having an extending flange 22 at the upper end thereof. A number of semi-circular notches 24 are formed along part of the outer surface of the socket through the extending flange 22. Each of the notches preferably extend below the surface of flange 22 a distance equal to the thickness of the metal of which the mounting plate or chassis 12 is constructed and terminate in a flat step 25. The socket body 10 is secured into the mounting plate 12 in the following manner:

A generally circular hole 26 (Fig. 4) is punched, or otherwise formed, in the chassis material 12. There are, however, provided a number of inwardly extending fingers 28 and 30, one at each end of a diameter of the hole 26. A number of fingers equal to the number of notches 24 may be used if desired. The spacing should be such that each finger will rest equally in a notch when socket body and plate are assembled. Slits 31 are lanced into the mounting plate material 12 at each side of the inwardly extending finger portions 28 and 30 so that fairly long finger portions are formed. The fingers 28 and 30 may be bent up as illustrated in Fig. 4 far enough so that their inner ends clear the cylindrical part of the body 10. The body 10 is then placed in aperture 26 with fingers 28 and 30 above opposing notches 24 in body 10. The fingers are driven or pressed downwardly until they rest against the bottoms 25 of the grooves 24 as indicated at 30 in Fig. 2. Preferably the ends of fingers 28 and 30 rest firmly against the walls of grooves 24 as indicated in Fig. 1 whereby rotational movement of body 10 is prevented. It will be seen that the socket is maintained securely in place in the mounting plate 12, but it may be readily removed and replaced if necessary by bending up fingers 28 and 30, pressing out the old socket and inserting a new socket. The mounting fingers 28 and 30 are then bent down again and the new socket securely maintained in position.

In the modification shown in Figs. 3 and 5, the aperture punched in the mounting plate material 12 is of circular configuration, and somewhat smaller in diameter than the diameter of the circular part of body 10. In this modification, the retaining fingers do not extend within the diameter of the hole 36. They are bent upwardly as at 38 and 40 in Fig. 5, and the area of the mounting plate material immediately surrounding aperture 36 is swaged downwardly to form a countersink around hole 36. The swaging operation increases the diameter of aperture 36 to an extent sufficient to receive the cylindrical portion of socket body 10. Thereafter, the socket is inserted and fingers 38 and 40 pressed downwardly into groove 24. In this modification it is preferred that the flange 22 of the socket body 10 be provided with a bevel 42 on its lower edge so formed as to correspond with the countersink surrounding aperture 36. Socket body 10 thus does not extend appreciably above the surface of sheet 12.

While I have particularly described and shown several modifications of the present invention it should be clearly understood that my invention is not limited thereto but that modifications within the scope of the invention may be made.

What is claimed is:

A socket device including a body of insulating material in the form of a short cylinder and having a number of contact clips secured therein, said body having a tapered flange at one end, there being a number of longitudinal grooves in the outer surface of said body and passing through said flange, each of said grooves terminating in a flat step, and a mounting plate into which said body is to be secured, said plate having an aperture formed therein having a diameter equal to the distance between the bottoms of a pair of opposing grooves, said plate being slit at a number of paired points to form opposed fingers adapted to be bent up to pass said body, the area about said aperture in said plate being swaged downwardly to form a countersink adapted to receive said flange whereby the upper surface of said body is substantially flush with said plate, said swaging operation increasing the size of said aperture sufficiently to pass the cylindrical part of said body, said body being secured in said aperture by said fingers being bent down against the flat step of said grooves.

References Cited in the file of this patent

UNITED STATES PATENTS

| Number | Name | Date |
|---|---|---|
| 1,191,649 | Barthels | July 18, 1916 |
| 1,698,449 | Petersen | Jan. 8, 1929 |
| 2,201,751 | Wertzheiser | May 21, 1940 |
| 2,291,001 | Smith | July 28, 1942 |
| 2,352,126 | Schmitt | June 20, 1944 |
| 2,461,487 | Wagstaff | Feb. 8, 1949 |
| 2,495,838 | Deakin | Jan. 31, 1950 |